(No Model.)
F. B. KENDALL.
CORN PLANTER CHECK ROWER.
No. 279,766. Patented June 19, 1883.
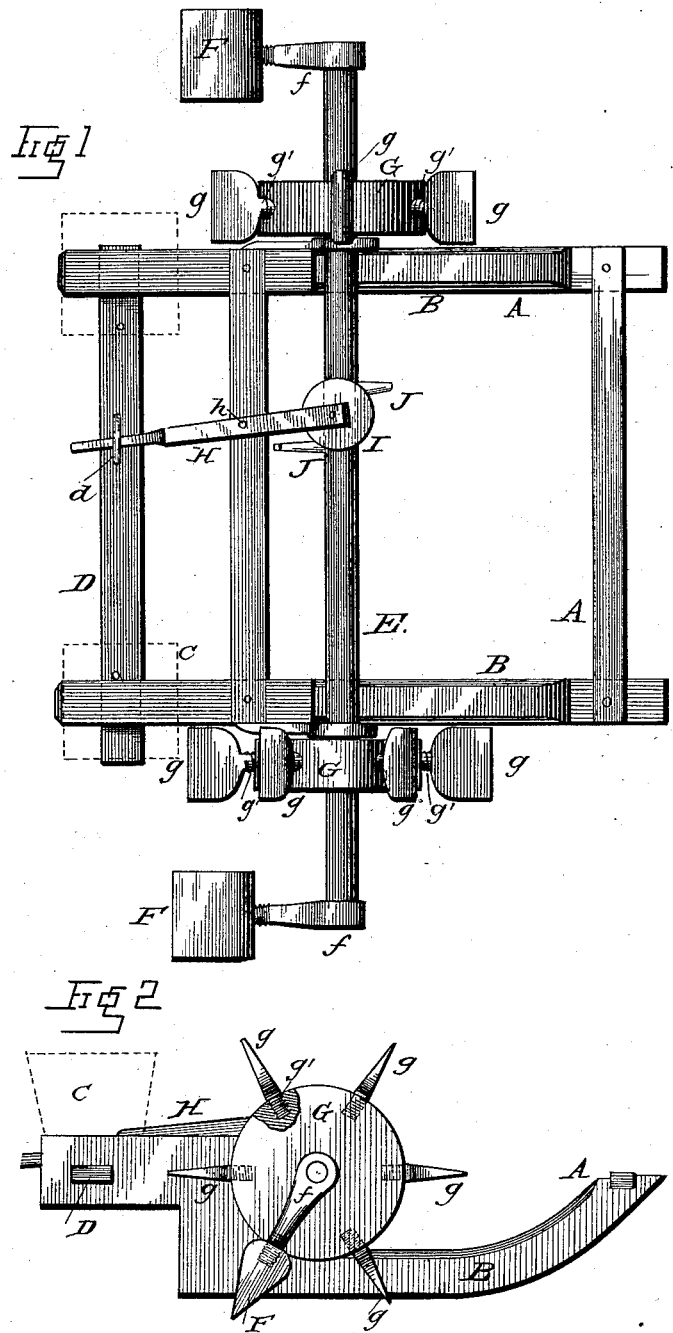
WITNESSES:
Fred. G. Dieterich
Jno. G. Hinkel
INVENTOR.
Francis B. Kendall
By W. B. Richards
ATTORNEY.

UNITED STATES PATENT OFFICE.

FRANCIS B. KENDALL, OF MONMOUTH, ILLINOIS, ASSIGNOR OF ONE-FOURTH TO JAMES B. CLARK, OF SAME PLACE.

CORN-PLANTER CHECK-ROWER.

SPECIFICATION forming part of Letters Patent No. 279,766, dated June 19, 1883.

Application filed January 27, 1883. (No model.)

*To all whom it may concern:*

Be it known that I, FRANCIS B. KENDALL, a citizen of the United States, residing at Monmouth, in the county of Warren and State of Illinois, have invented certain new and useful Improvements in Corn-Planter Check-Rowers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to corn-planter check-rowers of that class in which a transverse shaft rotated by impact with the soil of arms projecting from its ends is used as a means of actuating the slides of the planter; and the invention consists in constructions and combinations hereinafter described.

In the accompanying drawings, which illustrate my invention, and in which the similar letters used as marks of reference apply to the like parts in all of the figures, Figure 1 is a top plan. Fig. 2 is a side elevation.

Referring to the drawings by letters, letter A represents the forward frame of an ordinary corn-planter with ordinary runners, B, seed-boxes C, and bar D, connecting the seed-dropping devices, which seed-dropping devices are not shown.

E represents a shaft mounted in suitable bearings transversely on the frame A, and in front of the seed-boxes. The ends of the shaft E project beyond the sides of the planter, and to each outer end an arm, $f'$, is secured, which is screw-threaded at its outer end.

F are markers, made heavy, and wedge-shaped or sharp at their outer ends, and the other end of each provided with a screw-threaded hole, which receives the end of an arm, $f$, and thus secures the marker to the arm in such manner that it may be screwed upon the arm outward from or inward toward the shaft E. Between each arm $f$ and the side of the planter a disk, G, is secured upon the shaft E. Each disk G has a series of sharpened radial feet, $g$, with shanks $g'$, which are sharpened and screwed into holes in the disk. The feet $g$ on one disk G are arranged alternate in radial positions with reference to the feet on the other disk.

H is a lever journaled at $h$ to a frame-bar of the planter, and has a cam-disk, I, journaled to its forward end. The rear end of the lever H passes through a staple, $d$, which projects from the bar D.

J J are cam-arms projecting from opposite sides of the shaft E, and adapted, as the shaft is rotated, to strike the disk I alternately on opposite sides of the lever H, and thereby give an oscillating movement to said lever, and through it a reciprocating movement endwise to the bar D, and by the bar D movement to the seed-slides of the planter. The journaled cam-disk I will reduce the friction to a minimum quantity.

As the planter is moved forward in operation the feet $g$, coming in contact with the ground, will rotate the shaft E, and the alternate arrangement of the feet $g$ on the two disks G will cause a foot on one or the other disk to be constantly in contact with the ground. The rotation of the shaft E will operate the planter seed-slides, as hereinbefore described. By adjusting the feet $g$ outwardly or inwardly, as already described, the distance between the hills of corn may be regulated as desired. Two hills of corn are dropped at each rotation of the shaft E and one mark made by each marker F. When the feet $g$ are adjusted as described, the markers may also be adjusted to correspond therewith by screwing them inwardly or outwardly, as required, on their respective shafts $f$. The markers F, being heavy, can be brought in contact with the ground whenever desired, and especially when starting in at the ends of new bouts, by simply raising the front frame, A, when the markers will swing to their lowest position by their own gravity.

I am aware that adjustable arms and adjustable markers have been used separately on check-rowers, but am not aware that they have been used together, so that when one has been adjusted the other can also be changed to correspond. Therefore

What I claim as new, and desire to secure by Letters Patent, is—

1. In a corn-planter, in combination with the shaft E, disks G, adjustable feet $g$, and adjustable markers F, the cam lugs or arms J and lever H, adapted to impart movement to the seed-slides of the planter, substantially as and for the purpose specified.

2. In a corn-planter, in combination with the shaft E, the disks G, having adjustable feet $g$, and the adjustable markers F, substantially as and for the purpose specified.

3. In a corn-planter, in combination with the lever H and rotary shaft E, having cam-arms J, the disks G, having adjustable feet $g$, and adjustable gravitating markers F, substantially as and for the purpose specified.

In testimony whereof I affix my signature in presence of two witnesses.

FRANCIS B. KENDALL.

Witnesses:
R. J. GRIER,
E. E. CLIPPINGER.